United States Patent [19]

Cargould et al.

[11] Patent Number: 4,976,141
[45] Date of Patent: Dec. 11, 1990

[54] STEPPED RIM FOR TIRE TESTING MACHINE

[75] Inventors: Barry D. Cargould, Hudson; James C. Beebe, Kent, both of Ohio

[73] Assignee: Illinois Tool Works Inc., Chicago, Ill.

[21] Appl. No.: 487,832

[22] Filed: Mar. 5, 1990

[51] Int. Cl.⁵ .......................................... G01M 17/02
[52] U.S. Cl. ........................................ 73/146; 301/95
[58] Field of Search ............ 73/146; 152/379.4, 381.3, 152/381.4, 381.6; 301/95, 96, 97, 98

[56] References Cited

U.S. PATENT DOCUMENTS

| | | | |
|---|---|---|---|
| 2,515,167 | 7/1950 | Arel | 301/95 |
| 3,948,094 | 4/1976 | Honlinger | 73/146 |
| 4,373,567 | 2/1983 | Declereq | 152/381.3 |

Primary Examiner—Donald O. Woodiel
Attorney, Agent, or Firm—Wood, Herron & Evans

[57] ABSTRACT

A tire rim for a tire testing machine has a stepped contour providing multiple positions to accommodate tires of differing bead diameters. One or more filler rings are mountable on a bead seat to provide the proper contour for inflating a tire having the next smaller diameter bead seated on the adjacent bead seat.

3 Claims, 1 Drawing Sheet

STEPPED RIM FOR TIRE TESTING MACHINE

BACKGROUND OF THE INVENTION

This invention relates to rims for a tire testing machine and more particularly the invention relates to a rim whose contour is stepped to provide multiple bead seats to permit the testing, on one set of rims, of tires having differing bead diameters.

A tire has two beads that engage spaced bead seats of a contoured tire rim. Upon inflation, the beads form an airtight seal with the bead seats that holds the air in the tire at the inflation pressure.

Tires are manufactured in various sizes. The bead diameters have been standardized in 1" steps, as, for example, 13", 14", and 15" diameter beads. Similarly, the contour of the rim in the area of the bead seat has been standardized, and these standards have been published by the Tire and Rim Association, Inc. As will be seen hereafter, the bead seat per se is contoured precisely as is the immediately adjacent rim area that is contacted by the side wall inflation bulge immediately adjacent the tire bead.

Tire testing machines have two rim halves that are spaced apart. These halves are hydraulically brought together with a tire between the two halves. See U.S. Pat. No. 4,852,398. When the tire is in position between the two rim halves, the tire is inflated. Thereafter, it is rotated against a road wheel (sometimes load wheel) to simulate road conditions. Run out, lateral, and radial force variations are measured by the tire testing apparatus.

It is very important that the rim halves, when together, replicate the standard bead seat and inflation bulge contours. This substantially exact replication is necessary in order for the results produced by the tire testing machine to be meaningful in relation to the actual vehicle tire rims onto which the tires are to be mounted.

In tire testing machines, it would be desirable to use one set of rim halves for multiple bead diameters, e.g., 13", 14", and 15". But the rims cannot have, on one rim, seats for two adjoining bead diameters, e.g., 13" and 14". The bead seats per se can be contoured for adjoining bead diameters, but a tire seated on the smaller bead seat would not have the right contour immediately adjacent the bead to resist the inflation bulge. Where there should be a proper contour to resist the inflation bulge, there is instead the bead seat for the next larger tire.

BRIEF SUMMARY OF THE INVENTION

An objective of the present invention is to provide rims for tire testing machines that can seat, interchangeably, immediately adjoining bead diameters, e.g., 13" and 14" bead diameters.

This objective of the invention is attained by providing a removable ring or rings for the larger diameter bead seats. Each ring has a radially inner contour mating with that of the bead seat in order to sit snugly on the bead seat. Each ring is radially outwardly contoured to create the needed "inflation bulge" contour, that is to say, the contour that resists the inflation bulge immediately adjacent the tire bead.

Therefore, if a tire is seated on a 13" bead, Without the ring of the present invention, the 14" seat does not present the proper contour for the inflation bulge. But, if the ring is placed on the 14" seat, the ring provides the proper contour so that when the 13" tire is inflated, the inflation bulge immediately adjacent the 13" bead will be resisted by the special contour of the ring and, in testing, the tire will react as if on a conventional rim.

When a 14" tire is to be tested, the ring is removed from the 14" bead seat. If the rims are designed for testing only two tires, the outer portion of the rim adjacent the 14" bead seat is contoured to provide the inflation bulge resisting surface. On the other hand, if rims are designed for a 15" tire also, then the apparatus must be provided with a 15" removable ring to provide the proper contour for inflating a tire seated on the 14" bead.

The several features of the present invention will become more readily apparent from the following detailed description taken in conjunction with the accompanying drawings in which.

DETAILED DESCRIPTION OF THE DRAWINGS

Figure 1:
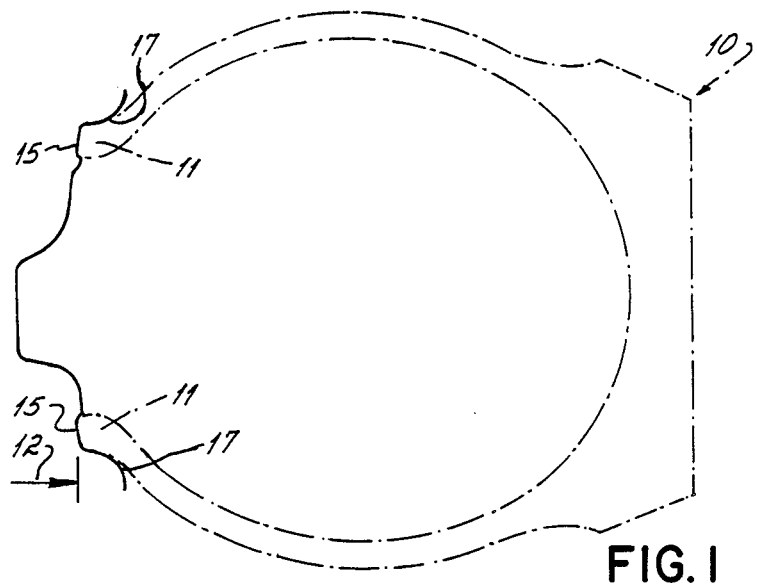
FIG. 1 is a standardized rim contour (with tire in broken lines), taken from The Tire and Rim Association Standards of 1988.
Figure 3:
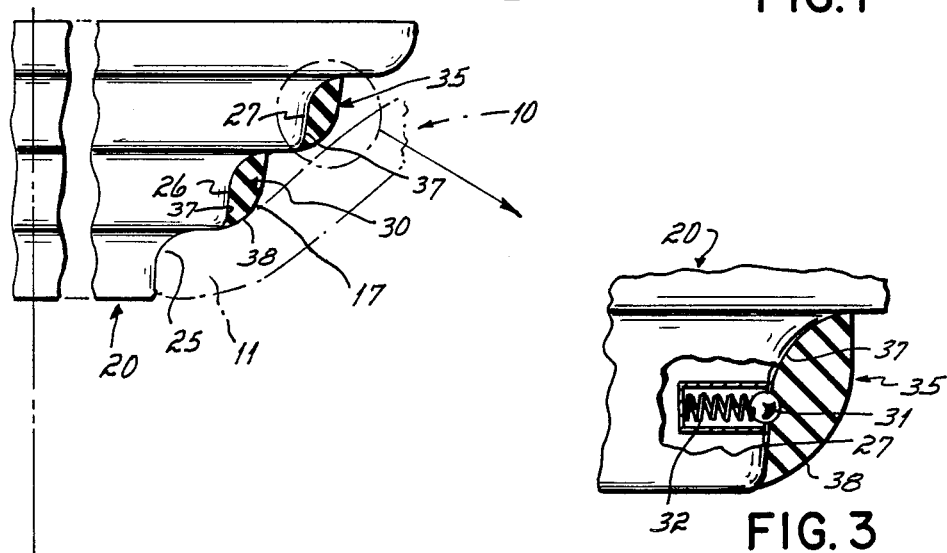
FIG. 3 is an enlarged view of the encircled area of FIG. 2.

Referring to FIG. 1, a tire 10 has beads 11. In a standard tire that bead diameter might be, for example, 14 inches as depicted by the arrow 12. That tire, when mounted on a rim, sits on the bead seat 15 which is also 14 inches in diameter. The rim has an inflation bulge section 17 forming an extension of the bead seat 15 and providing a rigid contour against which the inflation bulge of the tire presses when the tire is inflated. It is the inflation bulge section 17 that is restored or presented by the removable rings that are applied to the stepped rim of the present invention.

Figure 2:
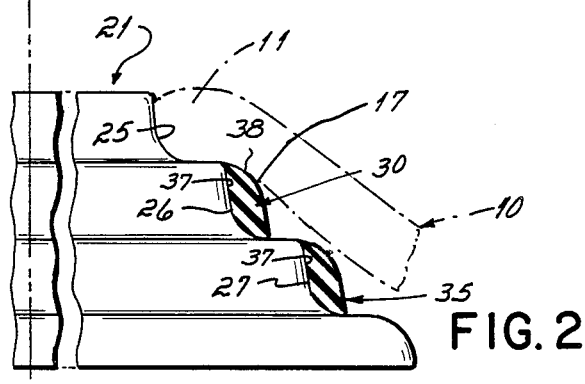
FIG. 2 is a cross-sectional view of one side of a set of rim halves (the rim halves being symmetrical about the centerline shown) and adapted to be mounted in a tire testing machine employing the present invention.

An upper rim (or rim half) 20 and a lower rim (or rim half) 21 are shown in FIG. 2. In practice, the rim halves are spaced apart to permit a tire to pass horizontally between the two rims. The lower rim half is then brought up, hydraulically under great pressure, to the proper vertical position with respect to the upper rim half, thereby simulating an actual tire rim. When rising, the lower rim 21 carries the tire, indicated at 10, into position so that its beads 11 seat properly on the bead seats 25, 26, or 27 (corresponding for illustrative purposes to 13", 14" and 15" diameter beads).

Each bead seat 25–27 is properly contoured in accordance with the standard seat 15 of FIG. 1. However, only the bead seat 27 for the 15" tire has the proper inflation bulge contour 17. Thus, if a tire were seated in the 13" seat 25, upon inflation, the inflation bulge immediately adjacent the bead would not be properly resisted as it would on a conventional tire rim because the adjoining bead seat 26 for the 14" tire renders that impossible.

To overcome that dilemma, the invention provides a filler ring 30 for the adjacent seat 26. A ball detent 31 urged by a spring 32 engages the ring 30 to hold it in position on the bead seat. A similar filler ring 35 is provided for the bead seat 27.

Each filler ring has a radially inner contour 37 that matches the bead seat contour and permits the filler ring to be seated properly in the bead seat. Each filler ring also has an inflation bulge contour 38 which, when the filler ring is inserted, forms an extension of the immediately adjacent bead seat and thus provides the desired inflation bulge contour immediately adjacent the bead seat in which the tire is lodged.

In the operation of the invention, if a 13" bead tire is to be tested, a filler ring 30 is applied. The tire is picked up by the lower rim half and brought up to position with respect to the upper rim half with the beads 11 seated on the bead seats 25. Preliminarily, the filler ring 30 has been inserted on the bead seat 26 to provide a contour 38 for the 13" tire seated on the bead seat 25. Thus, when the tire is inflated, the contours of the tire are held as if the tire were on an actual rim standardized by the Tire and Rim Association, Inc.

If a 14" tire is to be tested, the filler ring 30 is removed and a ring 35 is seated in the next adjacent bead seat 27 of each half rim 20, 21. The filler ring 35 provides the necessary inflation bulge resisting contour for a 14" tire seated on the bead seat 26.

Finally, if a 15" tire is to be measured, no filler rings are required, the rim halves 20, 21 having the required contour 17 for the inflation bulge of a tire seated on the bead seat 27.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. A half rim for a tire testing machine;
an outwardly tapering rim of circular cross section,
said rim being stepped to create two adjacent bead seats,
a filler ring having a radially inner contour seated on the larger of said two bead seats and having a radially outer contour to form a continuation of the smaller of said two bead seats and provide a surface for the inflation bulge of tire seated on the smaller of said two bead seats.

2. A rim as in claim 1 further comprising,
means for temporarily securing said filler ring on said bead seat.

3. A stepped rim for a tire testing machine comprising;
an upper rim,
a lower rim spaced from said upper rim,
a plurality of bead seats on each rim differing from each other in approximately one inch increments,
a filler ring for all but the smallest bead seat, each filler ring mating with its bead seat and having an outer contour forming a continuation of the adjacent smaller bead seat to provide a surface for inflation bulge,
means for temporarily mounting each said filler ring on a bead seat,
whereby said rims, with selected filler rings may be used to test a plurality of sizes of tires.

* * * * *